Sept. 11, 1951  J. G. POLK  2,567,856
ATTACHMENT FOR THE SPINDLE HOUSINGS OF DRILL PRESSES
Filed Sept. 8, 1948
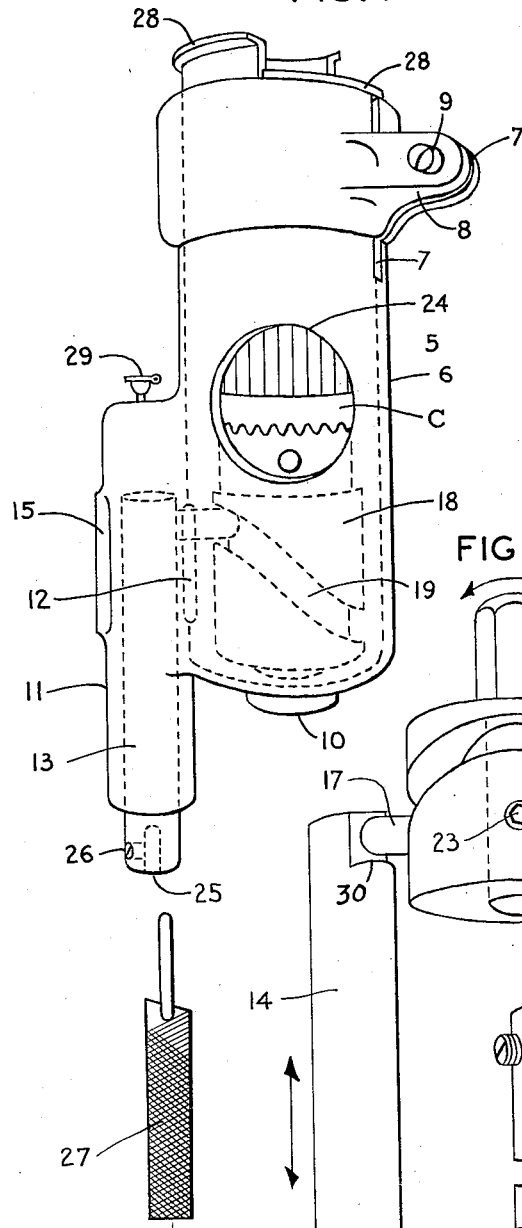
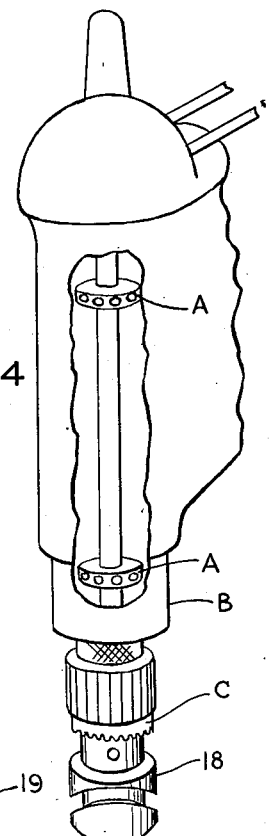
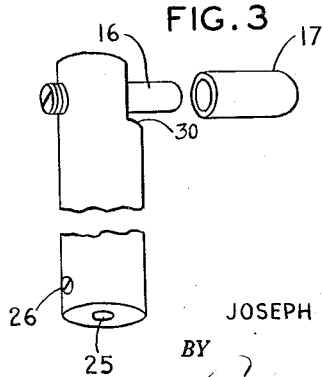
*INVENTOR.*
JOSEPH G. POLK Patented Sept. 11, 1951

2,567,856

UNITED STATES PATENT OFFICE 2,567,856

ATTACHMENT FOR THE SPINDLE HOUSINGS OF DRILL PRESSES

Joseph G. Polk, Freeport, N. Y.; Helen R. Polk administratrix of said Joseph G. Polk, deceased Application September 8, 1948, Serial No. 48,165

1 Claim. (Cl. 29—76)

This invention pertains to an attachment for the spindle housing of drill presses, said attachment to be employed for converting rotary power of the drill presses to reciprocating movement adapted for operating tools such as saws, files, broaches, reamers, punches, shapers and the like.

Heretofore, I have determined, after long experimentation, that the method of knocking off the chuck of a drill press, connecting a peripherally grooved cam thereto, with said cam journalled in a cylindrical casing and cooperating with and driving a ram—is a prolonged process and productive of unsatisfactory results. Firstly, forcibly removing the chuck by hammering or otherwise, damages the spindle taper. Secondly, journalling the cam in the casing results, often times, in binding primarily because the spindle is not exactly concentric with the spindle housing and the attachment, except in very expensive drill presses, resulting in rubbing of the cam on one side or other of the attachment housing, and scoring the cam and housing to such an extent that they will virtually freeze solid. This often causes the spindle to break.

A principal object of the invention is a drill press attachment wherein the cam will ride free in the housing of the attachment with the cam stem connected to the chuck, resulting in the cam revolving only on the drill press spindle bearings, to positively preclude rubbing and scoring of the housing and breakage of the spindle shaft. Another object is the provision of an attachment which may be employed not only on high priced machines but also on relatively inexpensive drill presses.

A further object is a drill press attachment to which may be connected without modification, standard files, saws, punches and other tools.

These and other objects will be apparent as the description of the invention unfolds.

In the drawings:

Fig. 1 is a perspective view of the drill press attachment with the cam stem illustrated being gripped by the chuck of a drill press.

Fig. 2 is a perspective view of the cam and reciprocating rod separate from the other parts of the attachment Fig. 3 is a fragmentary detail of the upper end of the reciprocating rod showing the dog and the roller unassembled.

Fig. 4 is a cutaway view showing the cam engaged by the chuck of a drill press, the rest of the drill press attachment not being shown; also illustrating the spindle bearings and spindle.

In the drawings, with particular reference to Fig. 1, numeral 5 denotes the outer casing, consisting generally of tubular housing 6, open at the top, longitudinally slit at 7 and provided with ears 8, and set screw 9, for purposes of tightening the attachment upon the spindle housing of a drill press.

Housing 6 is closed at the bottom and provided with lower projecting nub 10, designed for reinforcement or strengthening of the bottom of the housing.

Formed integrally with housing 6 and as a component of outer casing 5, is extension 11, the upper portion of which is arcuate-shaped, and extends longitudinally along the lower part of housing 6, the tubular shaped lower portion thereof forming a depending extension. Extension 11 and tubular housing 6 have common slotted aperture 12, for the purpose hereinafter described, while said extension is centrally bored at 13 to receive reciprocating rod 14 and is provided at its upper medial portion with removable cover plate 15, conventional set screws not being shown.

Bore 13, as depicted in Fig. 1 registers with slot 12 at the upper end thereof.

Reciprocating rod 14 has shoulder 30 at its upper end and is threaded to detachably receive elongated dog 16, the free end of which projects laterally from the rod, through slot 12 and slidably fits into roller 17. Fig. 3, as stated before, shows the dog and roller unassembled.

Cooperating with, and for imparting reciprocatory movement to rod 14, I provide cylindrical cam 18, of less diameter than that of the interior of housing 6, formed with continuous, peripheral angularly disposed cam groove 19, which slidably receives the free end of roller 17, and is centrally bored at 20 to snugly receive bar 21. The lower end of bar 21, when seated home, protrudes slightly below the bottom surface of the cam, so that the latter will not rub on the bottom of the housing 6 as it rotates therein.

The opposite end of bar 21 forms cam stem 22. In forming bar 21, I may take hex stock and turn down that portion below cam stem 22 to fit bore 20.

To fasten bar 21, set screw 23 is suitably threaded into cam 18. Thus, if cam stem 22 becomes worn, or for any other reason, it may be removed and replaced with the utmost facility. And too the cam stem 22 may be of any desired shape or size to fit drill chucks of different kinds. Further, the drill press spindle carrying the attachment is adjustable to the work as desired.

An opening 24 is provided in the side of housing 6, to accommodate a drill chuck wrench for tightening of the grip of the drill chuck upon cam stem 22.

For tool-holding means I provide socket 25 in the lower end of rod 14, with set screw 26 for tightening the inserted end of the tool, such as file 27.

To apply the attachment to a drill press, it is merely necessary to fit the upper, open end of housing 6, over the spindle housing of the drill press, until cam stem 22 fits snugly within the drill chuck, as indicated in Fig. 1.

The drill chuck is then tightened by manipulation of a chuck wrench through opening 24 provided in housing 6. Then the set screw 9 of housing 6 is tightened, rigidly fastening the attachment to the spindle housing of the drill press indicated by letter B in Fig. 4. When the drill press is energized, rotary movement of the chuck imparts reciprocatory movement to tool 27 through cam 18, roller 17, dog 16, and rod 14. One revolution of cam 18 transmits one stroke up and one stroke down of rod 14, with dog 16 guided by slot 12.

Socket 25 is adapted to detachably receive a variety of standard tools, such as files, saws, broaches, reamers, punches, shapers, and the like.

The attachment is affixable to a drill press as quickly as one can change a drill in the chuck of a drill press. It is adjustable to the work by the usual adjustment of the spindle housing. The attachment obviates the necessity for the purchasing of additional reciprocating tools, in addition to the considerable outlay necessary for a rotary drill press.

For fitting the different sizes and makes of drill presses I may provide varying sizes of split bushings 28, which shim the spindle housing to close fitting engagement with housing 6 of the attachment.

Cam 18 rides free in housing 6, and as it revolves only on the drill press spindle bearings, no rubbing or scoring of the housing results, and possible breakage of the spindle is obviated as well as binding or freezing of the parts. For the drill press spindle bearings are sufficiently widely spaced apart to take care of the additional thrust required by mounting the cam 18 on the chuck, see Letter A of Fig. 4.

Worn out parts are replaceable with facility, and as hereinbefore stated, the employment of different sizes and shapes of cam stem 22 is comprehended. Furthermore, refinements such as oil cup 29, for oiling rod 14, may be provided.

The attachment is mobile, handled easily and does not require a skilled mechanic to affix and operate.

I reserve the right to make such changes and modifications as may come within the scope of the appended claim.

I claim:

An attachment for use in conjunction with a drill press having a spindle housing, chuck and spindle shaft bearings, said attachment comprising a casing having a housing and an adjunct extension, with a registering slot therebetween, said housing open at the top and closed at the bottom, having an opening in one side thereof, a longitudinal slit at its upper portion with complemental ears and adjusting set screw, a cam of substantially less diameter than the inner diameter of the housing within the housing, said cam having a continuous peripherally and angularly disposed groove and a centrally positioned rod with an upper extending cam stem and protruding nub at the bottom, said rod, cam stem and nub slidably and removably mounted in the cam, said adjunct extension centrally bored to slidably receive a reciprocating rod having a tool receiving socket at the bottom thereof and mounting a tool therein, the upper portion of the last mentioned rod threaded to receive a laterally extending dog and enveloping roller, said roller adapted to slidably engage the cam groove, said open top of the housing with the chuck registering with the opening in the attachment adapted to fit over the spindle housing, the cam stem of the attachment adapted to be received in and engaged directly by the said chuck of the drill press without the removal of the chuck from the drill press, whereby upon tightening of the chuck through the opening in the housing and tightening the housing on the drill press and energizing the drill press, said cam rotates on the chuck and spindle bearings of the drill press free of the walls of the housing to impart movement to the reciprocating rod by the engagement of the dog of the rod with the continuous and angularly disposed groove of the cam.

JOSEPH G. POLK.

REFERENCES CITED

The following references are of record in the file of this patent:

UNITED STATES PATENTS

| Number | Name | Date |
|--------|------|------|
| 1,679,884 | Thomas | Aug. 7, 1928 |
| 2,240,755 | Briggs | May 6, 1941 |
| 2,282,728 | Kern | May 12, 1942 |
| 2,350,805 | Olving | June 6, 1944 |
| 2,381,087 | Stewart | Aug. 7, 1945 |
| 2,436,692 | Greene | Feb. 24, 1948 |

FOREIGN PATENTS

| Number | Country | Date |
|--------|---------|------|
| 610,082 | Germany | Mar. 1, 1935 |